3,450,716
PERFLUORO-4-OXO-2,5-DIMETHYL-2-FLUORO-CARBONYL-1,3-DIOXOLANE
Stanley Selman, Wilmington, Del., assignor to E. I. du Pont de Nemours and Company, Wilmington, Del., a corporation of Delaware
No Drawing. Continuation-in-part of application Ser. No. 226,737, Sept. 27, 1962. This application May 26, 1966, Ser. No. 553,047
Int. Cl. C07d *13/02*
U.S. Cl. 260—340.2                5 Claims

ABSTRACT OF THE DISCLOSURE

Perfluoro-4-oxo-2,5-dimethyl-2-fluorocarbonyl-1,3-dioxolane can be prepared by contacting and reacting hexafluoropropylene epoxide with a carbonyl compound at a temperature between 100 and 300° C. to produce perfluoropyruvyl fluoride. The perfluoropyruvyl fluoride is then held at a temperature between 100 and 300° C. to cause dimerization of the perfluoropyruvyl fluoride to the compound perfluoro-4-oxo-2,5-dimethyl-2-fluorocarbonyl-1,3-dioxolane.

---

This application is a continuation-in-part of copending application Ser. No. 226,737, filed Sept. 27, 1962, and now abandoned, to the same inventor.

The present invention relates to perfluoropyruvyl fluoride, its preparation, and to derivatives of perfluoropyruvyl fluoride.

Perfluoropyruvyl fluoride, having the formula $$CF_3-\overset{O}{\underset{\|}{C}}-\overset{O}{\underset{\|}{C}}-F$$

is prepared by contacting and reacting hexafluoropropylene epoxide with a carbonyl compound at a temperature between 100° and 300° C. The reaction is described by the following equation:

$$R-\overset{O}{\underset{\|}{C}}-R' + CF_3-CF\overset{O}{\underset{\diagdown}{\diagup}}CF_2 \longrightarrow CF_3-\overset{O}{\underset{\|}{C}}-\overset{O}{\underset{\|}{C}}-F + RCF_2R'$$

where R is a hydrocarbon radical of one to ten carbon atoms and R' is hydrogen or a hydrocarbon radical of one to ten carbon atoms. Preferred carbonyl compounds are these compounds in which R and/or R' are phenyl radicals, unsubstituted or substituted with substituents which do not interefere with the reaction.

The reaction between the carbonyl compound and the hexafluoropropylene epoxide is generally carried out under conditions in which as soon as the perfluoropyruvyl fluoride is formed, it is rapidly removed from the reaction system. This rapid removal is facilitated by carrying out the reaction at atmospheric pressure or below.

If the perfluoropyruvyl fluoride is not removed rapidly as it is formed, it dimerizes to the compound, perfluoro-4-oxo-2,5-dimethyl-2-fluorocarbonyl-1,3-dioxolane, having the structure $$CF_3-CF\overset{O}{\underset{O=C-O}{\diagdown}}\overset{COF}{\underset{\diagup}{C}}-CF_3$$

Perfluoropyruvyl fluoride can be maintained in contact with the reaction system, so as to form its dimer, by using a closed reaction vessel or by condensing and returning the volatilized perfluoropyruvyl fluoride back into the reaction vessel.

Both perfluoropyruvyl fluoride and its dimer are hydrolyzed by water to perfluoropyruvic acid releasing hydrogen fluoride, the perfluoropyruvic acid being obtained in the form of its mono-hydrate $$CF_3-\overset{O}{\underset{\|}{C}}-COOH\cdot H_2O$$

The acid mono-hydrate can be converted to the anhydrous acid by the use of conventional dehydrating agents such as $H_2SO_4$ or $P_2O_5$.

The resulting acid or its mono-hydrate may be reacted with bases, alcohols, and similar reagents to give acid derivatives normally obtained with fluorocarbon acids.

Reaction of perfluoropyruvyl fluoride with hexafluoropropylene epoxide in an inert aprotic organic solvent, preferably aliphatic polyethers having from 4 to 10 carbon atoms or aliphatic nitriles having from 2 to 4 carbon atoms, in the presence of an alkali metal fluoride catalyst, such as NaF, RbF, or CsF, results in the formation of perfluoro-2-oxo-3,6-dimethyl-1,4-dioxane which has the structure $$CF_3-CF\overset{O}{\underset{O=C-O}{\diagdown}}\overset{CF_2}{\underset{\diagup}{C}}CF-CF_3$$

if the temperature is maintained below 100° C., and preferably between −10 and 50° C. At these temperatures, if the epoxide is omitted from the reaction system, the dimer of perfluoropyruvyl fluoride is formed. The dioxolane, perfluoro-2,4-dimethyl-2-fluorocarbonyl-1,3-dioxolane, having the structure $$\begin{array}{c}CF_2-CF_3\\O\diagdown\diagup O\\FOC-C-CF_3\end{array}$$

is prepared by rearrangement of the dioxane. This rearrangement can be carried out in the presence of an inert aprotic organic solvent and alkali metal fluoride catalyst at temperatures in excess of 120° C. Thus, the temperature of the dioxane reaction system need only be raised after the in situ formation of the dioxane in order to make the dioxolane.

Although perfluoropyruvic acid is an extremely potent insecticide, the perfluoropyruvyl fluoride and its cyclic dimer are relatively inert. Hence, these two compositions are useful as soil fumigants and insecticides. In addition to forming perfluoropyruvic acid, these compounds also release hydrogen fluoride, which is an effective insecticide itself, when contacted with moisture.

The cyclic oxygen containing ring compounds formed from perfluoropyruvyl fluoride are useful intermediates in the formation of oxygen containing fluorocarbon solvents which are temperature stable and chemically inert and yet have good solvent properties, characteristic of cyclic ethers. The solvents are formed from the above-described cyclic intermediates by reaction with sulfur tetrafluoride which converts the carbonyl groups of the cyclic compounds to $CF_2$-groups. Thus, the cyclic intermediates can be converted to the following fluorocarbon ether solvents:

$$CF_3-CF\overset{O}{\underset{CF_2-O}{\diagdown}}\overset{CF_3}{\underset{\diagup}{C}}\diagdown_{CF_3} \quad \text{and} \quad CF_3-CF\overset{O}{\underset{CF_2}{\diagdown}}\overset{CF_2}{\underset{\diagup}{C}}F-CF_3$$

All of the described cyclic derivatives of perfluoropyruvyl fluoride and perfluoropyruvyl fluoride itself react with aqueous ammonia to result in ammonium salts which significantly lower the surface tension of water and, thus, are of utility as dispersing agents.

The invention is further illustrated by the following examples.

EXAMPLE I

Into a 500 ml. three necked flask, containing a gas inlet tube, a mechanical stirrer and a gas outlet tube is placed 200 g. of benzophenone. The gas outlet tube is connected to two cold traps in series. The first trap is maintained at −10° C. and the second trap at −80° C. during the reaction. The reaction flask is heated to, and maintained at, 225° C., while hexafluoropropylene epoxide is passed through the vigorously stirred benzophenone at 80 ml. per minute for five hours and then stopped. The reaction is carried out at atmospheric pressure.

The combined reaction product from both traps weighs 150 g. This product consists of a small amount of tri fluoroacetyl fluoride, about 30 g. of unreacted hexafluoropropylene epoxide and a remainder consisting of perfluoropyruvyl fluoride. The perfluoropyruvyl fluoride is purified by fractional distillation through a two foot, glass-helix-packed, low temperature column.

Perfluoropyruvyl fluoride is a yellow liquid which has a boiling point at +9 to +10° C. and characteristic infrared absorption bands at 5.4 and 5.6 microns. Nuclear magnetic resonance has further confirmed the structure of the product obtained. Hydrolysis of the perfluoropyruvyl fluoride by passing through water at room temperature, results in the formation of perfluoropyruvic acid hydrate having a melting point at 122 to 125° C.

Calculated for $$CF_3-\overset{O}{\underset{\|}{C}}-CO_2H \cdot H_2O$$

22.5% C, 35.6% F. Found: 22.1% C, 34.4% F. Neutralization equivalent: Cal.: 160. Found: 158.

The perfluoropyruvyl fluoride is converted into the sodium salt by passing through aqueous sodium hydroxide. Perfluoropyruvyl amide is formed by reacting the fluoride with ammonia; reaction with aqueous ammonia results in the formation of the ammonium salt of the acid.

Perfluoropyruvyl fluoride is also formed when benzaldehyde is substituted for benzophenone in the above-described procedure.

EXAMPLE II

Into a 330 cc. stainless steel lined autoclave is placed 150 g. of benzophenone and 137 g. of hexafluoropropylene epoxide. The autoclave is heated at 185° C. for 4 hours with agitation under autogeneous pressure, cooled to room temperature and the volatiles are vented. The liquid reaction product consists of two layers, which are separated. The low boilers dissolved in the upper layer are distilled out in vacuo and condensed in a cold trap (−78° C.). They are combined with the lower layer and the total product is distilled through a 3′ Podbielniak column. There is obtained 77 g. (67%) of perfluoro-4-oxo-2,5-dimethyl-2-fluorocarbonyl-1,3-dioxolane, B.P. 72° C., having the structure $$CF_3-CF\underset{O=C}{\overset{O}{\diagup}}\underset{\underset{O}{|}}{C}\underset{\diagdown}{\overset{CF_3}{\diagup}}\underset{F}{\overset{O}{\diagdown}}$$

Calculated for $C_6F_8O_4$: 25.0% C, 52.7% F. Found: 25.4% C; 51.8% F.

Infrared and nuclear magnetic resonance spectra are in accord with the structure of the compound.

Use of benzaldehyde instead of benzophenone results in the formation of the same compound in lower yield.

Hydrolysis of the dioxolane by mixing with water results in perfluoropyruvic acid mono-hydrate which is dehydrated by dissolving the mono-hydrate in concentrated $H_2SO_4$, heating the resultant solution to 80° C. for 1 hour, and recovering the anhydrous acid from the solution as a distillate by vacuum distillation.

EXAMPLE III

Into a 200 ml. flask containing a magnetic stirrer is placed 3 g. of cesium fluoride and 20 ml. of the dimethyl ether of diethylene glycol. The flask is cooled to 0° C. and 44 g. of perfluoropyruvyl fluoride is added. A small portion of the contents of the flask is withdrawn, distilled, and the dimer of perfluoropyruvyl fluoride, which is identical with the compound prepared in Example II, is obtained. The reaction mixture is kept at 0° C. and hexafluoropropylene epoxide, 50.6 g., is gradually added. The reaction proceeds rapidly during the addition of the epoxide consuming the epoxide as rapidly as it is added. The lower layer of the total reaction product is separated and distilled through a 3′ Podbielniak column. There is obtained 57 g. (73%) of perfluoro-2-oxo-3,6-dimethyl-1,4-dioxane, B.P. 70.0–70.5° C.

Calculated for $C_6F_{10}O_3$: 23.2% C, 61.3% F. Found: 23.5% C, 60.6% F.

Infrared and nuclear magnetic resonance spectra are in accord with the structure.

Perfluoro-2-oxo-3,6-dimethyl-1,4-dioxane is also obtained when perfluoro-4-oxo-2,5-dimethyl-2-fluorocarbonyl-1,3-dioxolane is used in place of perfluoropyruvyl fluoride.

Perfluoro-2-oxo-3,6-dimethyl-1,4-dioxane is added to water and hydrolyzed over a period of 8 hours. The resulting product is perfluoro-2-methyl-3-oxa-5-oxo-hexanoic acid hydrate. This hydroxy acid is neutralized by addition of aqueous sodium hydroxide and converted to the corresponding keto acid, perfluoro-2-methyl-3-oxa-5-oxo-hexanoic acid, by reaction with concentrated sulfuric acid.

Calculated for $C_6F_8O_4H$: 23.4% C, 55.5% F. Found: 23.3% C, 55.4% F.

The keto acid, B.P. 50° C./1 mm. Hg, is extremely hydroscopic forming a solid hydrate when exposed to the atmosphere. Both the keto acid and its hydrate are outstanding dispersing agents causing a significant lowering of the surface tension of water.

EXAMPLE IV

The reaction mixture of Example III obtained on reaction of perfluoropyruvyl fluoride with hexafluoropropylene epoxide is heated for 5 hours in a still lined autoclave at a temperature of 140° C. The lower layer of the resulting product is distilled and yields perfluoro-2,4-dimethyl-2-fluorocarbonyl-1,3-dioxolane, B.P. 60.5° C. in 70% yield having the structure $$\underset{FC}{\overset{CF_3}{\diagdown}}\underset{\underset{O}{\|}}{\overset{}{C}}\underset{\diagup}{\overset{O-CF_2}{\diagdown}}\underset{O-CFCF_3}{|}$$

Calculated for $C_6F_{10}O_3$: 23.2% C, 61.3% F. Found: 23.2% C, 61.3% F.

Infrared and nuclear magnetic resonance spectra are in accord with the structure of the compound.

The dioxolane is converted to a fluorocarbon solvent by reaction with sulfur tetrafluoride at a temperature of 150 to 200° C. in a pressure autoclave using hydrogen fluoride as the catalyst to give a compound having the structure $$\underset{CF_3}{\overset{CF_3}{\diagdown}}\overset{}{C}\underset{\diagup}{\overset{O-CF_2}{\diagdown}}\underset{O-CFCF_3}{|}$$

As many apparently widely different embodiments of this invention may be made without departing from the spirit and scope thereof, it is to be understood that this invention is not limited to the specific embodiments thereof.

What is claimed is:

1. Perfluoro-4-oxo-2,5-dimethyl-2-fluorocarbonyl - 1,3-dioxolane.

2. A process for preparing the compound of claim 1 comprising contacting and reacting at a temperature between 100 and 300° C. hexafluoropropylene epoxide with a carbonyl compound having the formula

wherein R is a hydrocarbon radical of one to 10 carbon atoms and R' is hydrogen or a hydrocarbon radical of one to 10 carbon atoms to form a reaction system containing perfluoropyruvyl fluoride, maintaining said fluoride in contact with said reaction system to dimerize said fluoride to the compound of claim 1, and recovering said compound.

3. The process of claim 2 wherein R is phenyl.
4. The process of claim 2 wherein R and R' are phenyl.
5. A process for preparing the compound of claim 1 comprising heating perfluoropyruvyl fluoride at a temperature between 100 and 300° C. to dimerize said fluoride to the compound of claim 1.

References Cited

UNITED STATES PATENTS 2,911,414  11/1959  Simmons _____ 260—340.2
3,321,517  5/1967  Selman _____ 260—340.2

ALEX MAZEL, *Primary Examiner.*

J. H. TURNIPSEED, *Assistant Examiner.*

U.S. Cl. X.R.

106—311; 252—357; 260—340.6, 340.9, 539, 535, 544, 561; 424—279